United States Patent [19]
Steinle et al.

[11] Patent Number: 5,406,066
[45] Date of Patent: Apr. 11, 1995

[54] METHOD AND APPARATUS FOR CORRECTING COLOR REGISTRATION ERROR

[75] Inventors: Michael J. Steinle; Greg A. Degi, both of Fort Collins, Colo.

[73] Assignee: Hewlett-Packard Company, Palo Alto, Calif.

[21] Appl. No.: 88,017

[22] Filed: Jul. 6, 1993

[51] Int. Cl.⁶ .............................................. H01J 40/14
[52] U.S. Cl. ................................. 250/208.1; 250/226
[58] Field of Search ........................... 250/208.1, 226; 257/431, 443, 53

[56] References Cited

U.S. PATENT DOCUMENTS

| | | | |
|---|---|---|---|
| 4,709,144 | 11/1987 | Vincent | 250/226 |
| 4,926,041 | 5/1990 | Boyd | 250/226 |
| 5,040,872 | 8/1991 | Steinle | 359/638 |
| 5,173,599 | 12/1992 | Setami | 250/208.1 |
| 5,227,620 | 7/1993 | Elder, Jr. | 250/208.1 |
| 5,287,162 | 2/1994 | De Jong | 355/326 R |
| 5,300,767 | 4/1994 | Steinle | 250/208.1 |

*Primary Examiner*—David C. Nelms
*Assistant Examiner*—Tiep H. Nguyen

[57] ABSTRACT

A photosensor device which comprises a first photosensor array having a first predetermined number of pixels for generating a first data signal indicative of a first color component image of an object which is imaged thereon; a second photosensor array having a second predetermined number of pixels for generating a second data signal indicative of a second color component image of the object which is imaged thereon; and color registration error correction means operatively associated with the photosensor array for correcting color registration error due to a predetermined difference in image size between the first color component image and the second color component image.

21 Claims, 7 Drawing Sheets

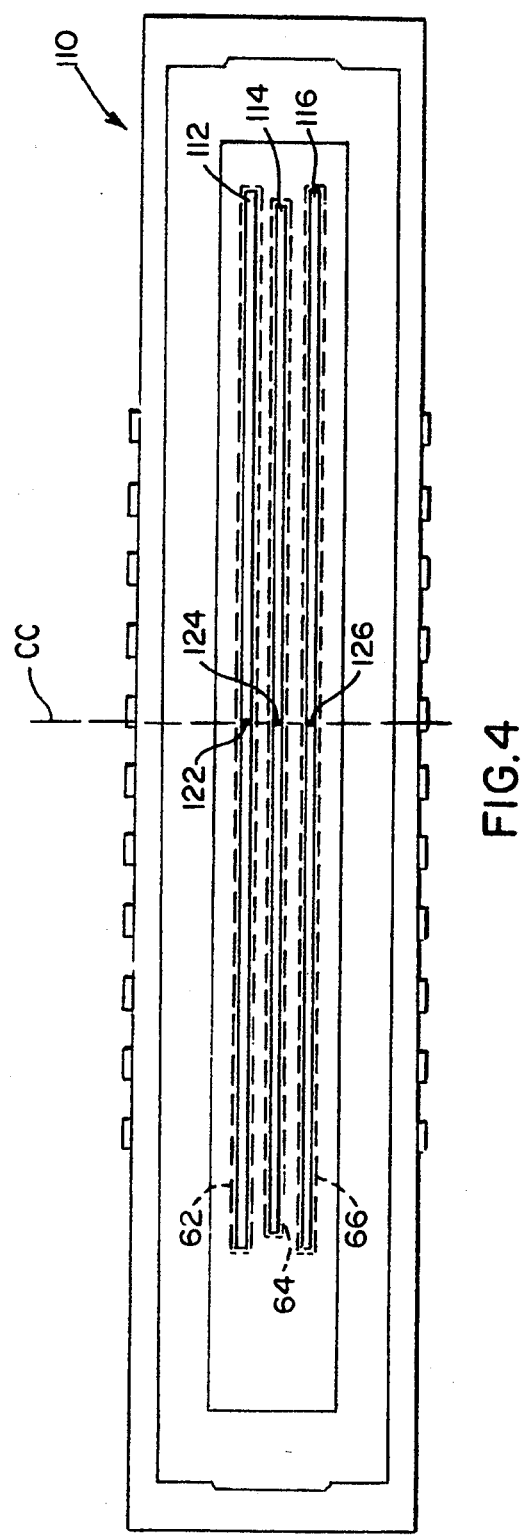

```
┌─────────────────────────────────────────────────────────┐
│ IN AN IMAGING ASSEMBLY IN WHICH THE LONG COLOR          │
│ COMPONENT IMAGES IMPINGE ALL OF THE PIXELS IN THEIR     │
│ RESPECTIVE ARRAYS, DETERMINE THE LENGTH RATIO "R"       │
│ BETWEEN THE SHORT (GREEN) COLOR COMPONENT IMAGE         │
│ AND A LONG (RED OR BLUE) COLOR COMPONENT IMAGE          │
└─────────────────────────────────────────────────────────┘
                             │
                             ▼
┌─────────────────────────────────────────────────────────┐
│ MULTIPLY THE NUMBER OF PIXELS IN ONE LINEAR             │
│ PHOTOSENSOR ARRAY BY "R" AND SUBTRACT THE RESULT        │
│ FROM THE NUMBER OF PIXELS IN ONE LINEAR ARRAY TO        │
│ DETERMINE THE NUMBER "N" OF "DROP PIXELS" TO BE         │
│ DROPPED FROM EACH PHOTOSENSOR ARRAY SIGNAL              │
└─────────────────────────────────────────────────────────┘
                             │
                             ▼
┌─────────────────────────────────────────────────────────┐
│ DIVIDE THE NUMBER OF PIXELS IN ONE ARRAY BY "N" TO      │
│ DETERMINE THE LOCATION OF "DROP PIXELS" IN EACH LONG    │
│ IMAGE ARRAY (I.E. EVERY NTH PIXEL IS A "DROP PIXEL")    │
└─────────────────────────────────────────────────────────┘
                             │
                             ▼
┌─────────────────────────────────────────────────────────┐
│ IN THE DATA SIGNAL PORTION CORRESPONDING TO THE         │
│ LONG IMAGE SENSOR ARRAYS (RED AND BLUE) REMOVE          │
│ THE DATA ASSOCIATED WITH EVERY NTH PIXEL, STARTING      │
│ FROM THE CENTER PIXEL AND MOVING OUTWARDLY IN           │
│ EACH DIRECTION                                          │
└─────────────────────────────────────────────────────────┘
                             │
                             ▼
┌─────────────────────────────────────────────────────────┐
│ IN THE DATA SIGNAL PORTION CORRESPONDING TO THE         │
│ SHORT IMAGE SENSOR ARRAY (GREEN) REMOVE THE DATA        │
│ ASSOCIATED WITH THE FIRST N/2 PIXELS AND THE LAST N/2   │
│ PIXELS                                                  │
└─────────────────────────────────────────────────────────┘
                             │
                             ▼
┌─────────────────────────────────────────────────────────┐
│ CORRELATE THE REMAINING PIXEL DATA FROM EACH            │
│ LINEAR PHOTOSENSOR, STARTING BY CORRELATING THE         │
│ DATA FROM THE CENTER PIXELS IN EACH ARRAY AND THEN      │
│ PROGRESSING OUTWARDLY IN BOTH DIRECTIONS SUCH           │
│ THAT EACH PIXEL IN EACH ARRAY HAS ONE                   │
│ CORRESPONDING PIXEL IN EACH OF THE OTHER ARRAYS         │
└─────────────────────────────────────────────────────────┘
```

FIG. 5

METHOD AND APPARATUS FOR CORRECTING COLOR REGISTRATION ERROR

BACKGROUND OF THE INVENTION

The present invention relates generally to optical systems which generate data signals representative of color images of objects and, more particularly, to a multi-array optical sensor device used in such optical systems which corrects color registration error.

Imaging devices such as color scanners, video cameras, camcorders and the like produce data signals representative of color images of subject objects. Such data signals typically comprise three separate data signals which are representative of red, green and blue color component images of the object. Various methods for generating color component image signals are described in U.S. Pat. No. 4,709,144 of Vincent which is hereby specifically incorporated by reference for all that is disclosed therein.

FIG. 1 is a schematic illustration of a prior art optical scanner device such as the flatbed scanner described in U.S. Pat. No. 4,926,041 of Boyd, et al. which is hereby specifically incorporated by reference for all that it discloses. This optical scanning device 10 images a scan line 12 with an imaging lens assembly 14. The lens assembly 14 images the scan line 12 at an image plane PP. A beam splitter assembly 16 is positioned in the path of the imaging light beam 18 and splits the imaging beam 18 into red, green and blue color component beams 22, 24, 26 having parallel, spaced-apart central longitudinal axes.

The beam splitter assembly 16 comprises a first beam splitter 30 comprising a support member 32, a first transparent plate member 34, and a second transparent plate member 36. The first transparent plate member is coated with a first dichroic coating 38 on one face surface 40 thereof. This coating may be a red light-reflecting dichroic coating. The first transparent plate member is coated with a second dichroic coating 42, which may be a green light-reflecting dichroic coating, on a second face surface 44 thereof. A first face surface 46 of the second plate 36 is positioned adjacent to dichroic coating 44. The second face surface 48 of plate 36 is coated with a third dichroic coating 49 which may be a blue light-reflecting dichroic coating. The distance $X_1$ between the first dichroic coating and the second dichroic coating is equal to the distance $X_2$ between the second dichroic coating and the third dichroic coating.

The beam splitter assembly 16 comprises a second beam splitter 50 comprising a support member 52 a first transparent plate member 54 and a second transparent plate member 56. The second beam splitter may be constructed identical to the first beam splitter with the exception that the order of the dichroic layers is reversed, i.e. red light-reflecting dichroic layer 57 is positioned at the exposed surface of beam splitter 50, green light-reflecting layer 58 is located between the two plates and blue light-reflecting layer 60 is located between plate 54 and member 52. The distances between coating layers 57, 58, 59 and 60 are equal to those on plates 34 and 36. Thus $X_1=X_2=X_3=X_4$. As described in detail in the above referenced patents, the purpose for using such a compound beam splitter assembly 16 is to equalize the light path lengths of each of the color component beams 22, 24, 26 as they pass through the beam splitter such that the red, green and blue focused images 62, 64, 66 are all focused on a single image plane PP extending perpendicular to the central longitudinal axes of the component beams. However, as graphically illustrated by FIG. 1, the focused images 62, 64 and 66 are not actually located on the same plane due to the chromatic aberration of lens assembly 14. The amount of chromatic aberration depends upon the particular lens design and function. In the illustration of FIG. 1 the red and blue component beams 22, 26 have a nearly identical best focus distance however the green beam 24 has a substantially shorter best focus distance than the other two beams.

An optical sensor device 80 adapted for use in the optical scanning device 10 is shown in plan view in FIG. 2. The optical sensor device 80 comprises a first linear sensor array 82 adapted to sense the red light image 62; a second linear sensor array 84 adapted to sense the green image 64 and a third linear sensor array 86 adapted to sense the blue image 66. The linear sensor arrays 82, 84, 86 are coplaner, equal length and equally spaced apart.

Each linear sensor array is constructed from a single row of adjacently positioned picture elements (pixels) 91, 93, 95 which each generate a data signal indicative of the intensity and duration of light impinged thereon during each operating interval of the optical sensor device 80. Each pixel has an identical size and shape. A typical pixel is square in shape and may be, e.g., 7.000 microns in the longitudinal direction and in the transverse direction. In one typical optical sensor device there are 5,340 pixels in each linear sensor array 82, 84, 86. A typical operating interval for an optical sensor device 80 is 4.6 milliseconds. Thus, at the end of each operating interval, the optical sensor device generates a data signal which includes a first signal portion including discrete data from each individual pixel in the first linear sensor array; a second signal portion including discrete data from each pixel in the second linear sensor array; and a third signal portion including discrete data from each pixel in the third linear sensor array. This data signal is transmitted as by electrical contacts 88, 90, etc. to filtering circuitry, etc. and then ultimately to a personal computer or the like (not shown) which may store the information in the data signal or use the data signal to generate a color display image of the object such as by use of a conventional display monitor (not shown) or a conventional color printer (not shown).

As illustrated in FIG. 1, the optical sensor device 80 is positioned such that the plane of the three linear sensor arrays 82, 84, 86 is coincident with the nominal image plane PP of lens assembly 14. However, due to chromatic aberration of the lens there is not in actuality a single image plane PP because of the fact that the focused color component images 62, 64, 66 do not all lie within a single plane. As previously indicated, color component images 62 and 66 do lie approximately within the same plane but color component image 64 does not lie within this plane. In a typical embodiment using a lens assembly with a magnification ratio of −0.165 image 64 may be spaced a distance of 70–95 microns from the plane of images 62 and 66. In such a situation approximate focus of each component image is obtained by positioning the sensor plane of the sensor device 80 at nominal image plane PP which is approximately halfway between the position of image 64 and images 62 and 66. Accordingly, a slight blurring of each of the images 62, 64, 66 occurs because of the fact that plane PP is not coincident with any of the positions of focused images 62, 64, 66.

Currently, achromatic doublets and other complex lens designs are used to minimize the effect of chromatic aberration. These systems are able to obtain simultaneous focus at two design wavelengths, however, for a continuous spectrum it is still not possible to simultaneously focus three color component beams on the same image plane. Achromatic doublet lenses are also expensive to produce.

Another method used to overcome the focus error problem described above is to design an optical system which utilizes curved reflectors or mirrors rather than lenses. However such a solution is quite expensive and limits the amount of imaging light which is directed onto an optical sensor due to central obscurations in the curved reflectors.

Another method for correcting for lens chromatic aberration is to employ a compound beam splitter having glass plates of different thicknesses to vary the path length of a particular component beam as described in U.S. Pat. No. 5,040,872 of Steinle which is hereby incorporated by reference for all that it discloses. However, a problem with this technique has been that the focused component beams have different magnifications on the image plane leading to color registration error in the resulting data signal.

It would be generally desirable to provide an optical system which overcomes the above discussed problems of color component focus accuracy and which is nevertheless relatively inexpensive to produce, which produces excellent image resolution, and which minimizes the number of lenses needed in the associated lens assembly.

SUMMARY OF THE INVENTION

The present invention is directed to method and apparatus for overcoming the problem of focus error in color imaging devices produced by chromatic aberration in imaging lenses.

In the imaging system of the present invention, the optical path lengths of the color component beams are adjusted relative to one another such that the image produced by each of the component beams is in exact focus on the same image plane. In a compound beam splitter device this adjustment may be provided by adjustment of the plate thickness of the beam splitter and transparent plate members. However, since the focal distances of the three color component images are not the same, a color component beam having a relatively shorter focal distance produces a relatively smaller image on the image plane than a color component beam having a relatively longer focal distance. As a result, since a larger image will impinge upon more pixels in its linear sensor array than a relatively shorter image will impinge upon in its linear sensor array, a problem known as color registration error develops. This problem simply stated is that there is not a one-to-one correspondence between the pixels associated with each color component image.

The present invention overcomes this color registration problem by two alternative methods.

According to one method, the data signals generated by each of the linear photosensor arrays are manipulated to equalize the amount of pixel data from each photosensor array. This result may be obtained by subtracting selected pixel data from a photosensor associated with a larger image or may be obtained by generating and then adding "pseudo-pixel" or "emulated pixel" data to the signal from a photosensor array associated with a smaller image. The end pixels in the array associated with a smaller image which are not impinged by the smaller image may be disabled or may be subtracted out of the signal using signal processing techniques. Both such techniques (pixel addition and pixel subtraction) may be used at once.

An alternative method for correcting the color registration error problem is to construct a photosensor array with pixels which are scaled to the particular linear sensor array in which they are located such that each of the photosensor arrays contain the same number of pixels even though all of the photosensor arrays are not of the same size. One method for doing this is to exactly scale the size of each pixel to the relative size of the associated image which is to be impinged thereon. For example, in the case of a pair of linear photosensor arrays, if the line image to be focused on a first linear photosensor array is two percent longer than the line image associated with a second linear photosensor array, then the pixels in the first linear photosensor array would be construed to be two percent longer than the pixels in the second linear photosensor array. This same technique could be used for two-dimensional type arrays except both the length and width of the pixels would be scaled rather than just the length.

Thus the invention may comprise a photosensor device comprising a first photosensor array having a first predetermined number of pixels for generating a first data signal indicative of a first color component image of an object which is imaged thereon; a second photosensor array having a second predetermined number of pixels for generating a second data signal indicative of a second color component image of the object which is imaged thereon; and color registration error correction means operatively associated with the photosensor array means for correcting color registration error due to a predetermined difference in image size between the first color component image and the second color component image.

The invention may also comprises a method of correcting color registration error in an optical system which has first and second color component images of the same object imaged on first and second pixel arrays of an optical photosensor device comprising the steps of determining the size ratio between the first and second color component images and constructing the optical photosensor device such that a data signal corresponding to the first color component image contains data from the same number of pixels as the data signal corresponding to the second color component image.

BRIEF DESCRIPTION OF THE DRAWING

An illustrative and presently preferred embodiment of the invention is shown in the accompanying drawing in which:

FIG. 4 is a top plan view of an optical sensor device having three linear photosensor arrays which are not all identical in length.

FIG. 5 is a block diagram of the operations performed by a signal processor on the data signal from an optical sensor device.

DETAILED DESCRIPTION OF THE INVENTION

Figure 1:
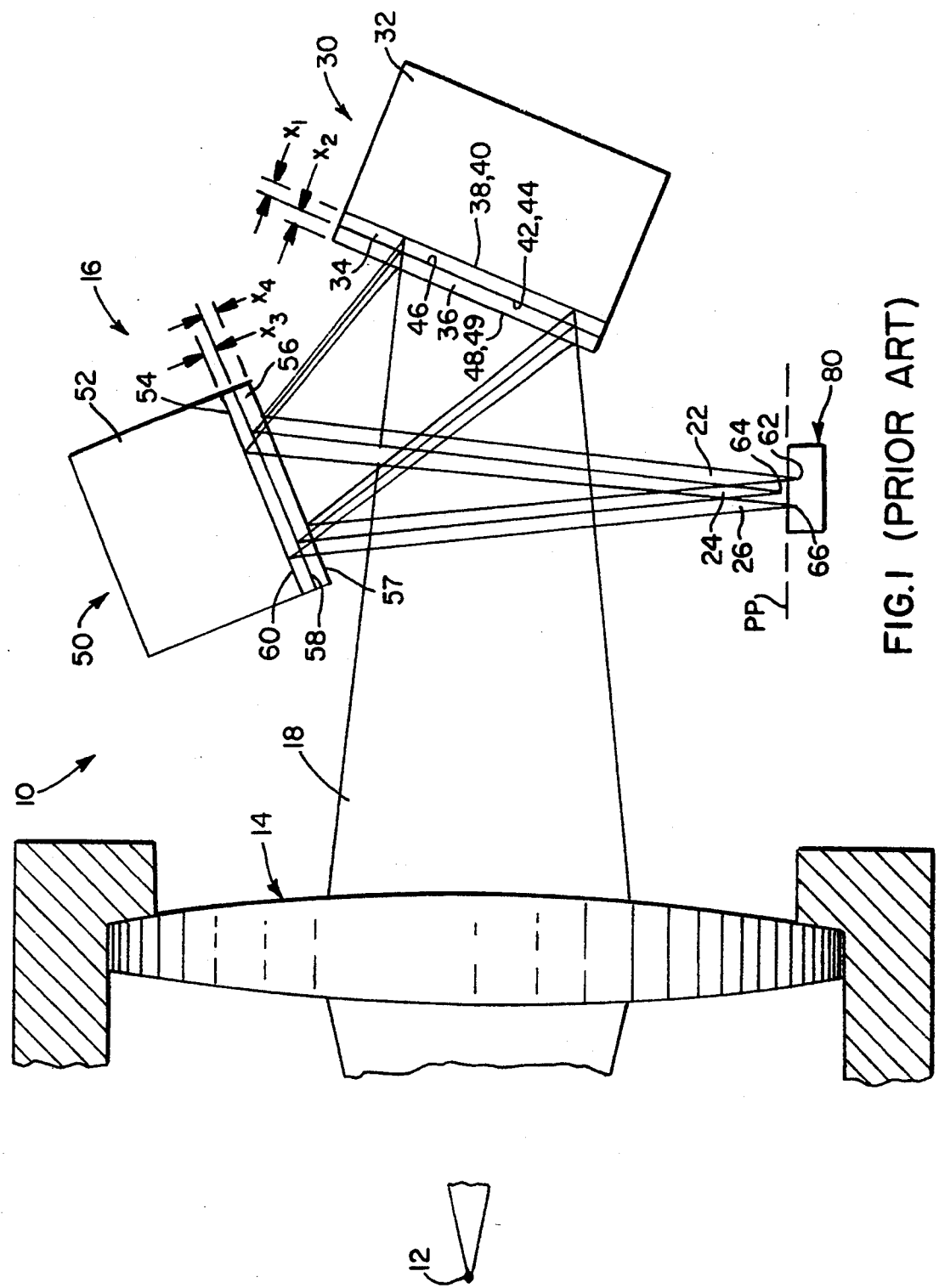
FIG. 1 is a schematic illustration of a prior art color optical scanner.
Figure 3:
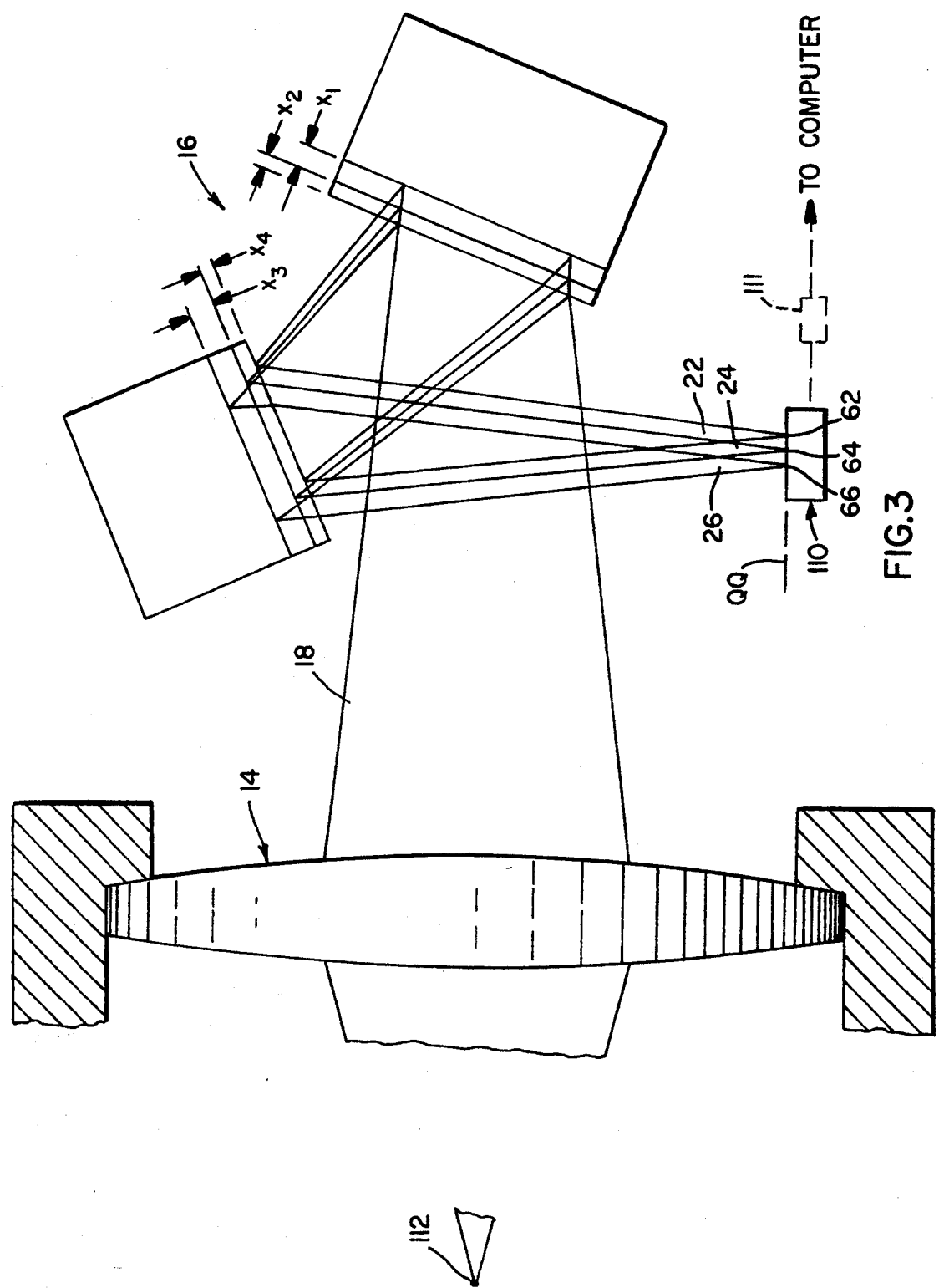
FIG. 3 is a schematic illustration of a color optical scanner in which the path lengths of color component beams have been adjusted to obtain focus of all color component beams at a single image plane.

FIG. 3 illustrates a color optical scanning device 11 which may have a lens assembly 14 and beam splitter assembly 16 identical to that described above with reference to FIG. 1 except that the distance $X_1$ is greater than the distance $X_2$; the distance $X_3$ is greater than the distance $X_4$; $X_1=X_3$ and $X_2=X_4$. The distances of $X_1$, $X_2$, $X_3$ and $X_4$ are selected such that the component beams 22 (red) and 26 (blue) each have an equal path length to the image plane which is exactly equal to the focus distance of component beams 22 and 26 and such that color component beam 24 (green) has a path length to the image plane (which is shorter than the path length of components 24 and 26). Accordingly, all three color component images 62, 64, 66 are in exact focus on image plane QQ where the sensor arrays of sensor device 110 are located.

Physical Scaling of Pixels

FIG. 4 is a top plan view of one embodiment of an optical sensor device 110 having three linear photosensor arrays 112, 114, 116 adapted to sense red, green and blue images 62, 64 and 66 respectively. Photosensors 112 and 116 are of equal length. Photosensor 114 is slightly shorter in length, e.g. 0.115% shorter, than the other two linear photosensor arrays. The central pixels 122, 124, 126 in all three linear photosensor arrays are in lateral alignment along axis CC which bisects and extends perpendicular to the longitudinal axis of each linear array.

The ratio between the length of photosensor array 114 and photosensor array 112 is identical to the ratio of image size between the red image 62 and green image 64. In one preferred embodiment of the invention the scale of the pixels in linear photosensor array 114 relative to the pixels in linear photosensor array 112 corresponds identically to the length ratios of the two linear photosensor arrays in terms of pixel length i.e. the direction measured along the longitudinal axis of the photosensor array. The width of each pixel in each array i.e. the dimension measured transversely of the linear photosensor array may be identical in each array. Thus there are an equal number of pixels in linear photosensor array 112, 114 and 116 resulting in a one-to-one correspondence between the pixels in each array obviating any color registration error in the system.

In another preferred embodiment of the invention only a portion of the pixels in linear photosensor array 114 are different in size from the pixels in linear photosensor arrays 112 and 116. In commercial embodiments of the invention in which it is difficult or impossible to specify pixel lengths of a particular scaled size this arrangement provides a reasonable alternative. The smaller dimension pixels are evenly spaced throughout the linear photosensor array 114 and are of a size and number such that the total number of pixels in linear photosensor array 114 is identical to the number of pixels in linear photosensor array 112. In this embodiment of the invention even though there are an equal number of pixels in each linear photosensor array, there is a very slight color mis-registration between pixels in linear photosensor array 114 and 112, however the mis-registration may be maintained at a very low level through inclusion of a sufficient number of reduced size pixels at equal length intervals-such that the maximum registration error between any two pixels remains exceedingly small and invisible to the human eye. Tables 1 and 2 illustrate typical dimensions and spacing for pixels in a color optical scanner in which the lengths of linear arrays 112 and 116 are 37,380 μm and the length of linear photosensor array 114 is 37,337 μm and in which each linear pixel array contains 5,340 pixels. As illustrated by Table 1, every 31st pixel in the green array is of a reduced size so as to decrease the length of the green array to a length proportionate to the length of the green image. The data signal produced by this linear photosensor device 110 thus produces nearly exact color registration of all three color component images. It will of course be understood that rather than using spaced-apart smaller pixels in the short (green) photosensor array, the same result could be achieved by adding larger spaced-apart pixels to the longer arrays so as to maintain an equal number of pixels in each array.

TABLE 1

| | Pixel Size | | |
|---|---|---|---|
| ROW | PIXEL LENGTH (μm) | PIXEL WIDTH (μm) | LENGTH (mm) |
| 1 | 7.000 (All) | 7.000 (All) | 37.380 |
| 2 | Every 31st PIXEL 6.750 μm DEFAULT = 7.000 μm | 7.000 (All) | 37.337 |
| 3 | 7.000 (All) | 7.000 (All) | 37.380 |

NOTE:
At Datum pixel number 2675 all rows will have the same X-location.

TABLE 2

| Row 2 Pixel Length | |
|---|---|
| PIXEL RANGE | PIXEL LENGTH (μm) |
| 1 to 30 | 7.000 |
| 31 | 6.750 |
| 32 to 61 | 7.000 |
| 62 | 6.750 |
| 63 to 92 | 7.000 |
| 93 | 6.750 |
| . | . |
| . | . |
| 5332 | 6.750 |
| 5333 to 5340 | 7.000 |

Manipulation of Pixel Data Signal

Figure 2:
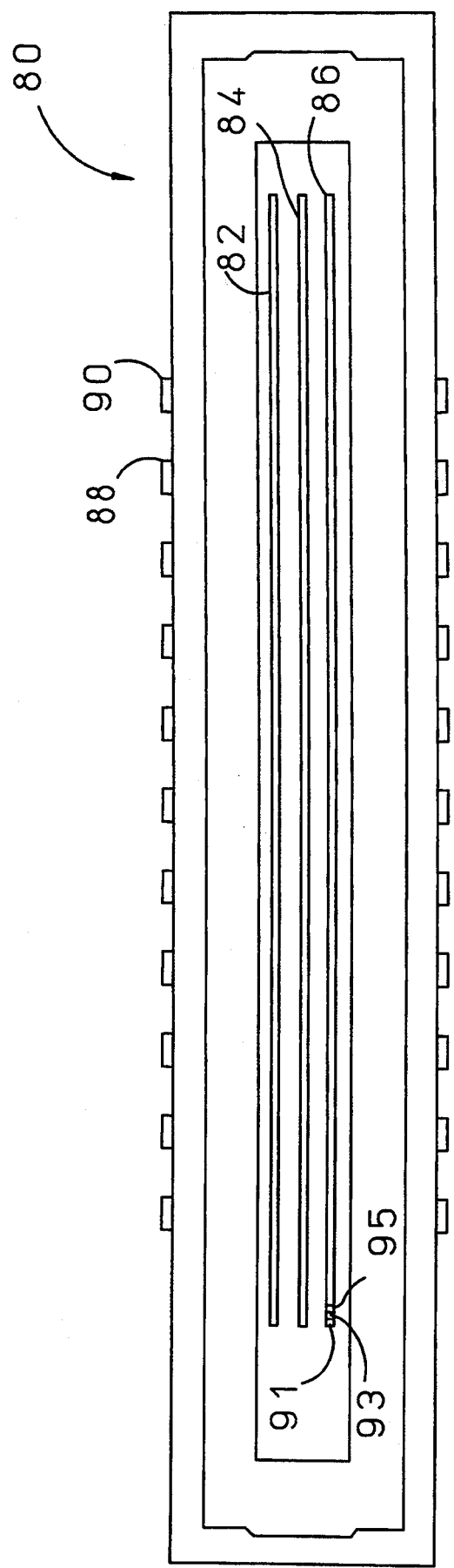
FIG. 2 is a top plan view of a prior art photosensor device having three equal length linear photosensor arrays and equal sized pixels.

A method for adjusting the data signal from a linear photosensor in which all of the pixels are of the same size in each array and in which each array is equal in length is shown by the process sequence of FIG. 5. In this example, as in the preceding examples, the green image is the short image and the blue images, which is equal in length to the red image, is the long image. In this embodiment photosensor 110, FIG. 3, may be identical in construction to that described above with reference to unit 80 in FIG. 2, i.e., all linear arrays are the same length and have identically sized pixels, and have the same number of pixels. In this embodiment the processing circuitry or software of a data processing unit 111 may perform the functions illustrated in FIG. 5. The first three steps of the data manipulation method illustrated in FIG. 5 could of course be performed as a design set-up step based upon the particular system specifications such that the only function performed by the circuit is to count pixel data and drop the appropriate data.

In a similar signal manipulation method for achieving color registration, data from "pseudo-pixels" is added to the data stream from the short sensor at evenly spaced intervals. The number of pseudo-pixels added is, again, determined based upon the length ratio between images. The value of each pseudo-pixel will depend upon its position in the data stream and may be equal to the average value of the two pixels next to its insertion point in the data stream. Using either the addition or subtraction technique the data signal from the short sensor is initially processed to remove the pixel data associated with pixels that are not impinged by the shorter image associated with that sensor. In the alternative, the sensor associated with the shorter image may simply be constructed with fewer pixels so as to be of the same proportionate length as the associated image.

Figure 6:
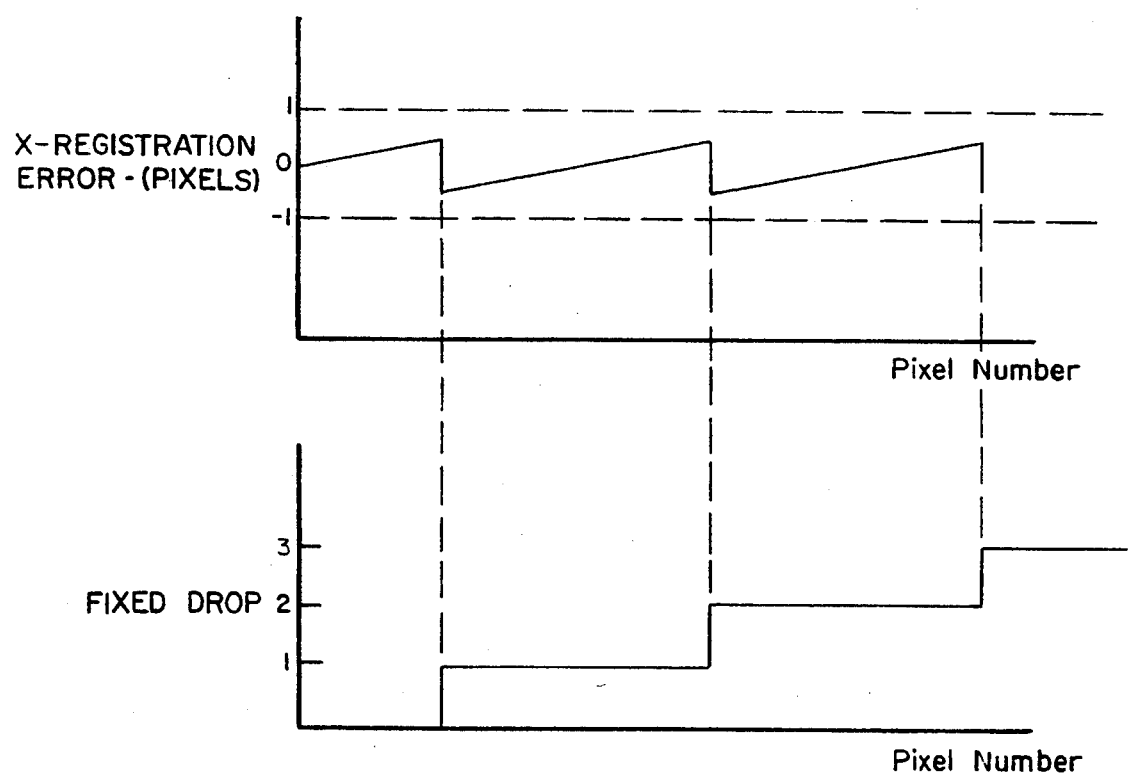
FIG. 6 is a compound graph illustrating the reduction in color registration error achieved by the signal processor of FIG. 5.

The relative error produced by the data signal manipulation method illustrated in FIG. 5 may be extremely low as illustrated in FIG. 6 and approximates the error associated with the embodiment of the scaled pixel assembly discussed above with reference to Tables 1 and 2.

Figure 7:
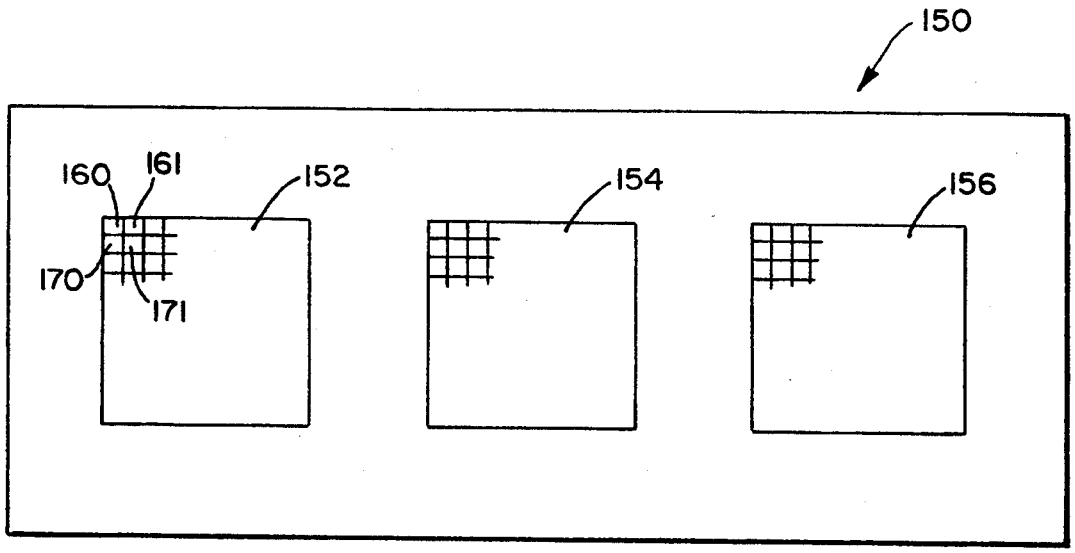
FIG. 7 is a top plan view of a photosensor device having three identical two-dimensional photosensor arrays with equal sized pixels in each.

FIG. 7 is a top plan view of an optical sensor unit 150 having three two-dimensional pixel arrays 152, 154, 156. The pixels 160, 161, 170, 171, etc. in each array are identical in size and shape and the arrays 152, 154, 156 are identical in size and shape. The optical assembly associated with unit 150 may be identical to that described above with reference to FIG. 3 to achieve focus of all component images on an image plane, except that a two-dimensional image rather than a line image is projected onto the image plane at which the arrays 152, 154, and 156 are located. Other optical systems for producing two-dimensional images such as are used in camcorders and the like could, of course, also be used.

In the embodiment of FIG. 7 the problem of color registry error is corrected in the same general manner as described with reference to FIG. 5 except that the function of "pixel dropping" is performed in association with a two-dimensional array rather than a line array. Thus in each row of pixels the same data may be dropped as in the single row model and, in addition, pixel data from entire rows are dropped at evenly spaced intervals corresponding generally to the pixel drop interval along each row. The amount of pixel data dropped (or added in the form of "pseudo-pixels") depends, as in the previously described example, on the size ratio of the component images associated with each pixel array.

Figure 8:
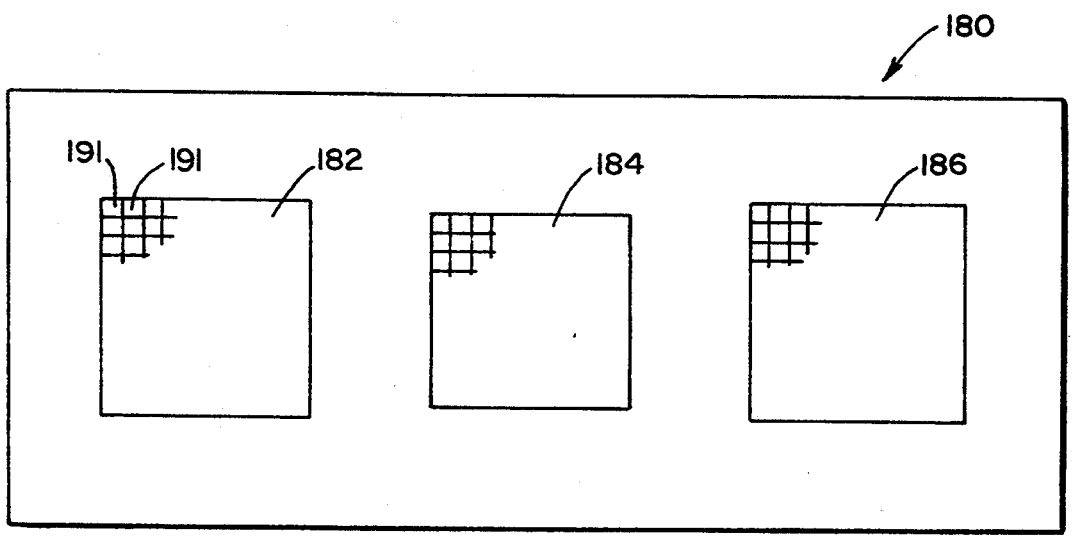
FIG. 8 is a top plan view of a photosensor device having three nonidentical two dimensional photosensor arrays with pixels scaled to the size of each array.

As illustrated in FIG. 8, rather than using a photosensor unit having identical two-dimensional pixel arrays 152, 154, 156, a photosensor unit 180 having scaled two-dimensional pixel arrays 182, 184, 186 may be used to eliminate color registration error. Thus, as illustrated in exaggerated form in the drawing, in the embodiment of FIG. 8 the pixels 190, 191, etc. in each different array 182, 184, 186 are scaled to the size of the color component image associated with that array.

It is contemplated that the inventive concepts herein described may be variously otherwise embodied and it is intended that the appended claims be construed to include alternative embodiments of the invention except insofar as limited by the prior art.

What it claimed is:

1. A photosensor device comprising:
   first photosensor array means having a first predetermined number of pixels for generating a first data signal indicative of a first color component image of an object which is imaged thereon;
   second photosensor array means having a second predetermined number of pixels for generating a second data signal indicative of a second color component image of said object which is imaged thereon; and
   color registration error correction means, operatively associated with said photosensor array means for correcting color registration error due to a predetermined difference in image size between said first color component image and said second color component image.

2. The invention of claim 1, color registration error correction means comprising data processing means operable on at least one of said first and second data signals.

3. The invention of claim 2, first color component image being larger than said second color component image, said data processing means comprising means for processing said first data signal for removing data associated with predetermined pixels from said first data signal such that data from substantially a same number of pixels as in said second data signal is provided by said processed first data signal.

4. The invention of claim 3, said predetermine pixels in said first linear photosensor array with which said data removal is associated being substantially evenly spaced apart in said first photosensor array.

5. The invention of claim 2 first color component image being larger than said second color component image, said data processing means comprising means for processing said second data signal for adding data to said second data signal corresponding to emulated additional pixels such that data from approximately a same number of pixels as in said first data signal-is provided by original pixels and said emulated pixels of said processed second data signal.

6. The invention of claim 5, said emulated pixels being emulated to be substantially evenly spaced apart in said second photosensor array.

7. The invention of claim 1 wherein said color registration error correction means comprises scaled pixels in said second photosensor array means which are scaled relative to said pixels in said first photosensor array means, said first and second photosensor array means being of different sizes.

8. The invention of claim 7, wherein said pixels in said second photosensor array means are of identical size and are scaled relative to said pixels in said first photosensor array means in correspondence with a size ratio of said color component images.

9. The invention of claim 7, wherein a first number of pixels in said second photosensor array means are of identical size to those in said first photosensor array means and wherein a second number of substantially evenly spaced apart pixels in said second photosensor array means are of a different size than those of said first photosensor array means, said second number of pixels being scaled in size such that said first data signal contains data from substantially a same number of pixels as said second data signal.

10. A method of correcting color registration error in an optical system having first and second color component images of a same object imaged on first and second pixel arrays, respectively, of an optical photosensor device comprising the steps of:
 a) determining a size ratio between said first and second color component images;
 b) based upon the size ratio constructing the optical photosensor device such that a data signal corresponding to the first color component image contains data from a same number of pixels as a data signal corresponding to the second color component image.

11. The invention of claim 10 wherein step b comprises:
 manipulating a data signal initially output by the second pixel array to subtract data associated with predetermined pixels in said second pixel array.

12. The invention of claim 10 wherein step b comprises:
 manipulating a data signal initially output by the first pixel array to add data to emulate the output of additional pixels at predetermined locations in said first pixel array.

13. The invention of claim 10 wherein step b comprises:
 constructing said first and second pixel arrays of different sizes corresponding to sizes of said first and second color component images;
 constructing at least some pixels in said second linear pixel array of a different size from pixels of said first pixel array.

14. The invention of claim 13 wherein said step of constructing at least some of the pixels in said second linear pixel array of a different size from said pixels of said first pixel array comprises constructing all of said pixels of said second pixel array on a scale relative to said pixels of said first array which corresponds to said ratio of images determined in step a.

15. The invention of claim 13 wherein said step of constructing at least some of the pixels in said second linear pixel array of a different size from said pixels of said first pixel array comprises constructing some pixels of said second pixel array which are arranged in an evenly spaced pattern on said second array of a uniform different size from the other pixels of said second pixel array.

16. A method of constructing a photosensor device having a plurality of separate imaging portions comprising separate pixel arrays for use in sensing color component images of an object from an imaging system wherein the imaging system produces at least two color component images of different sizes on an image plane comprising the steps of:
 a) determining a size of each of first and second color component images of said at least two color component images;
 b) constructing each imaging portion such that a data signal with data from substantially a same number of pixels is produced by each imaging portion in response to the at least two color component images which are focused thereon.

17. The invention of claim 16, step b comprising the steps of:
 constructing a first of said pixel arrays of a size at least as large as said determined size of said first color component image using a plurality of pixels having a first pixel size;
 constructing a second of said pixel arrays of a size at least as large as said determined size of said second color component image using a plurality of pixels at least some of which are of a size different from said first pixel size such that a total number of pixels in said second pixel array which are impinged by said second color component image is substantially equal to a total number of pixels in said first pixel array which are impinged by said first color component image.

18. The invention of claim 16, step b comprising the step of:
 constructing a first and second of said pixel arrays with identically sized pixels;
 providing a signal processor which processes a data signal from the second pixel array so as to selectively remove data associated with predetermined pixels such that the processed data signal from the second pixel array contains data from substantially a same number of pixels as a data signal from the first pixel array.

19. A color optical scanner for generating a data signal representative of a color component image of an object comprising:
 imaging lens means for imaging an object on an image plane;
 beam splitter means for spatially separating an imaging light beam passing through said imaging lens means into at least two color component beams having different length light paths to said image plane whereby a first color component image produced by a first of said at least two color component beams is a different size than a second color component image produced by a second of said at least two color component beams;
 first pixel array means comprising a plurality of pixels of a first predetermined size located at said image plane in alignment with said first color component beam for producing a data signal representative of said first color component image;
 second pixel array means located at said image plane in alignment with said second color component beam for producing a data signal representative of said second color component image; said second pixel array means comprising a plurality of pixels of a second predetermined size different from said first predetermined size and of a scale relative thereto such that data from substantially a same number of pixels is generated by each of said pixel arrays in response to the color component image which is imaged thereon.

20. The invention of claim 19 wherein all of said pixels in said first pixel array are of a first size and wherein all of said pixels in said second pixel array are of a second size and wherein a size ratio of said pixels in said first and second arrays corresponds to a size ratio of said first and second color component images.

21. The invention of claim 19 wherein all of said pixels in said first pixel array are of a first size and wherein a first number of said pixels in said second pixel array are of a said first size and wherein a second number of said pixels in said second pixel array are of a second size wherein a size ratio of a total pixel area occupied by said first pixel array to that of said second pixel array corresponds to a size ratio of said first and second color component images and wherein a number of pixels in each of said pixel arrays is substantially the same.

* * * * *